(12) United States Patent
Gage et al.

(10) Patent No.: US 10,035,464 B2
(45) Date of Patent: Jul. 31, 2018

(54) MULTI-LEVEL REAR STORAGE SYSTEMS AND METHODS FOR VEHICLES

(71) Applicant: Toyota Motor Engineering & Manufacturing North America, Inc., Erlanger, KY (US)

(72) Inventors: Sergei I Gage, Redford, MI (US); Arata Sato, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 11 days.

(21) Appl. No.: 15/247,983

(22) Filed: Aug. 26, 2016

(65) Prior Publication Data

US 2018/0056880 A1 Mar. 1, 2018

(51) Int. Cl.
*B60R 5/04* (2006.01)

(52) U.S. Cl.
CPC .................... *B60R 5/045* (2013.01)

(58) Field of Classification Search
CPC ...................................... B60R 5/045
USPC ...................................... 296/24.44
See application file for complete search history.

(56) References Cited

U.S. PATENT DOCUMENTS

| | | | |
|---|---|---|---|
| 3,424,489 A | 1/1969 | Gordon | |
| 3,720,437 A | 3/1973 | Lambert | |
| 4,954,038 A | 9/1990 | Sheahan | |
| 5,364,154 A | 11/1994 | Kaiser | |
| 5,567,111 A | 10/1996 | Gearin et al. | |
| 5,669,745 A | 9/1997 | Anderson | |
| 6,176,535 B1 * | 1/2001 | Chaloult | B60N 2/3011 211/134 |
| 6,345,943 B1 | 2/2002 | Lawson et al. | |
| 6,450,742 B1 | 9/2002 | Jenkins et al. | |
| 7,014,237 B1 | 3/2006 | Eekhoff et al. | |
| 8,814,245 B1 * | 8/2014 | Welch | B60R 5/04 296/37.16 |
| 9,156,607 B2 | 10/2015 | Adams | |
| 2001/0053315 A1 | 12/2001 | Julian | |
| 2007/0206999 A1 | 9/2007 | Clive-Smith | |
| 2014/0375807 A1 * | 12/2014 | Muetzel | H04N 7/18 348/148 |

FOREIGN PATENT DOCUMENTS

JP 2012035767 A * 2/2012

* cited by examiner

*Primary Examiner* — Joseph D. Pape
*Assistant Examiner* — Dana D Ivey
(74) *Attorney, Agent, or Firm* — Dinsmore & Shohl LLP

(57) ABSTRACT

A vehicle includes a rear door assembly having an open configuration that allows access to a rear storage volume and a closed configuration that inhibits access to the rear storage volume. A multi-level rear storage system is located in the rear storage volume. The multi-level storage system has a retracted configuration where a shelf member is relatively near a rear floor of the rear storage volume and an extended configuration with the shelf member spaced-apart from the rear floor thereby defining an upper rear storage volume above the shelf member and a lower rear storage volume below the shelf member.

17 Claims, 5 Drawing Sheets

MULTI-LEVEL REAR STORAGE SYSTEMS AND METHODS FOR VEHICLES

TECHNICAL FIELD

The present specification generally relates to rear storage systems for vehicles and, more specifically, to multi-level rear storage systems and methods for vehicles.

BACKGROUND

Vehicles commonly include a trunk where items, such as groceries and luggage can be stored and transported between locations. The trunk includes a trunk floor, in part, defining a trunk storage volume where the items are placed and a trunk door that can be opened to allow access to the trunk storage volume and closed to inhibit access to the trunk storage volume. Typically, the trunk storage volume is a static volume in that there is no availability to change or reconfigure the trunk storage volume. Such a static arrangement can limit item placement within the trunk storage volume.

Accordingly, a need exists for reconfigurable rear storage volumes and multi-level rear storage systems.

SUMMARY

In one embodiment, a vehicle includes a rear door assembly having an open configuration that allows access to a rear storage volume and a closed configuration that inhibits access to the rear storage volume. A multi-level rear storage system is located in the rear storage volume. The multi-level storage system has a retracted configuration where a shelf member is relatively near a rear floor of the rear storage volume and an extended configuration with the shelf member spaced-apart from the rear floor thereby defining an upper rear storage volume above the shelf member and a lower rear storage volume below the shelf member.

In another embodiment, a method of increasing surface area in a rear storage volume of a vehicle is provided. The method includes providing a multi-level rear storage system located in the rear storage volume. The multi-level storage system has a retracted configuration where a shelf member is relatively near a rear floor of the rear storage volume and an extended configuration with the shelf member spaced-apart from the rear floor. The multi-level storage area is placed in the extended configuration thereby defining an upper rear storage volume above the shelf member and a lower rear storage volume below the shelf member.

In yet another embodiment, a multi-level rear storage system for a rear storage volume of a vehicle includes a shelf member that is located relatively near a rear floor of the rear storage volume in a retracted configuration and located spaced-apart from the rear floor in an extended configuration thereby defining an upper rear storage volume above the shelf member and a lower rear storage volume below the shelf member. The multi-level rear storage system is sized to be placed in the extended configuration with a rear door of the vehicle in a closed configuration to inhibit access to the rear storage volume.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally related to vehicles and methods that utilize multi-level rear storage systems that can provide configurable shelving within a rear storage volume of the vehicle. The rear storage volume is that volume located behind a rear seat and is accessible through a rear door, such as a trunk door, lift gate, etc. The multi-level rear storage systems may include a retracted configuration where one or more shelf members are retracted toward a rear floor to reduce presence of the shelf members within the rear storage volume and an extended configuration where one or more shelf members are located above the rear floor to provide additional surface area above the rear floor where items can be placed. In the extended configuration, the multi-level rear storage systems are sized to allow the rear door to be placed in a closed configuration to enclose and inhibit access to the rear storage volume and the items located therein.

Figure 1:
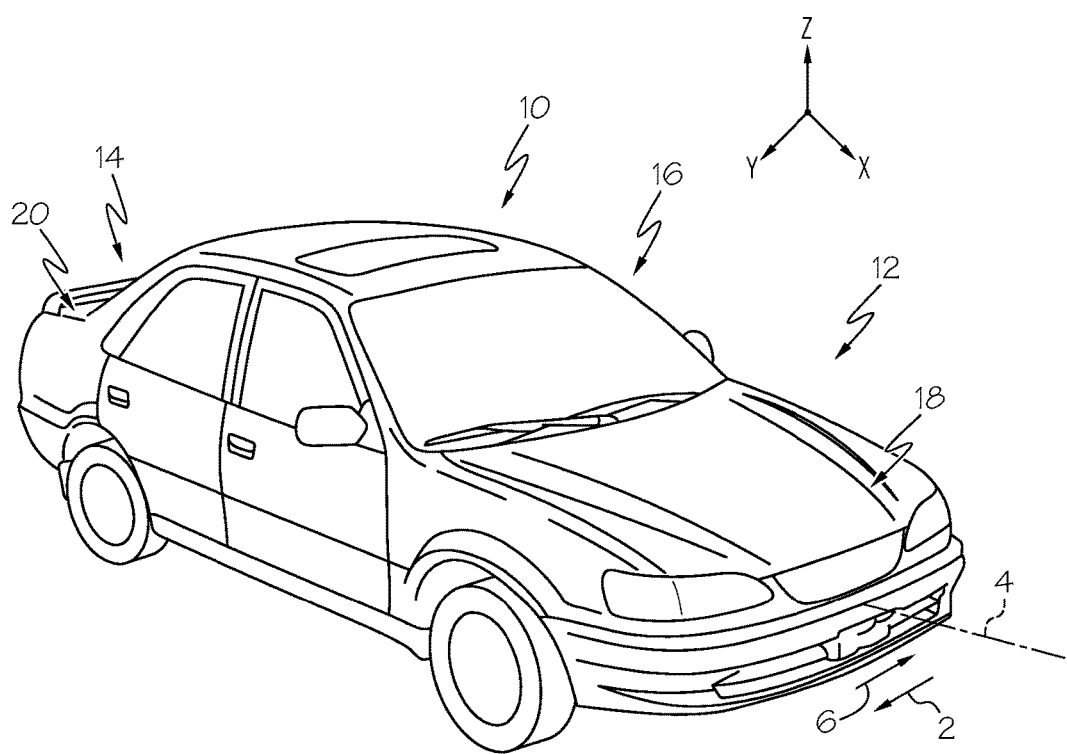
FIG. 1 illustrates a perspective view of a vehicle, according to one or more embodiments shown and described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

Referring to FIG. 1, the vehicle 10 includes a front 12, a rear 14 and a cabin 16 that is located between the front 12 and the rear 14 of the vehicle 10. The front 12 of the vehicle 10 includes a hood assembly 18 that can be used to cover an engine compartment with the hood assembly 18 in a closed configuration. The rear 14 of the vehicle 10 includes a rear door assembly 20 that can be used to cover a rear storage volume with the rear door assembly 20 in a closed configuration.

Figure 2:
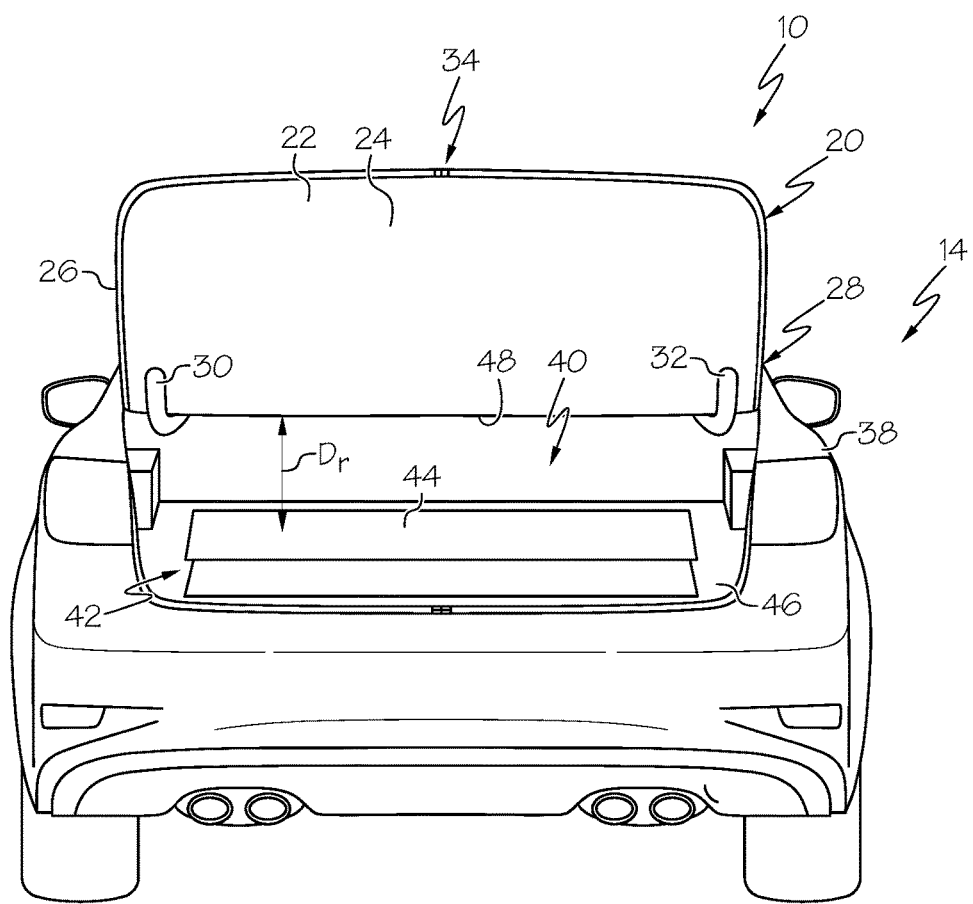
FIG. 2 illustrates a rear view of the vehicle of FIG. 1 including a multi-level rear storage system in a retracted configuration, according to one or more embodiments shown and described herein.

Referring to FIG. 2, the rear 14 of the vehicle 10 is illustrated with the rear door assembly 20 in an open configuration. The rear door assembly 20 includes a rear door 22 that is generally formed by a rear door inner panel 24 and a rear door outer panel 26 that is connected to the rear door inner panel 24. A hinge assembly 28 includes a pair of hinge arms 30 and 32 that rotatably connect the rear door 22 to vehicle body 38 and can allow for movement of the rear door 22 between the open and closed configurations. In some embodiments, the hinge assembly 28 may be biased toward the open configuration such that the rear door 22 tends to move toward the open configuration upon unlatching of a rear door latch assembly 34. The rear door latch assembly 34 can be locked in the closed configuration using the rear door latch assembly 34, which can inhibit access to rear storage volume 40.

The vehicle 10 further includes a multi-level rear storage system 42 that is disposed within the rear storage volume 40. As illustrated by FIG. 2, the multi-level rear storage system 42 includes at least one shelf member 44 that is in a retracted configuration. In the retracted configuration, the shelf member 44 may be positioned on or near a rear floor 46 that defines part of the rear storage volume 40. In the retracted configuration, an increased distance Dr may be provided between the shelf member 44 and a top 48 of the rear storage volume 40. As such, the retracted configuration of the multi-level rear storage system 42 can facilitate placement of relatively tall items within the rear storage volume 40 with reduced interference from the shelf member 44 due to its position on or near the rear floor 46.

Figure 3:
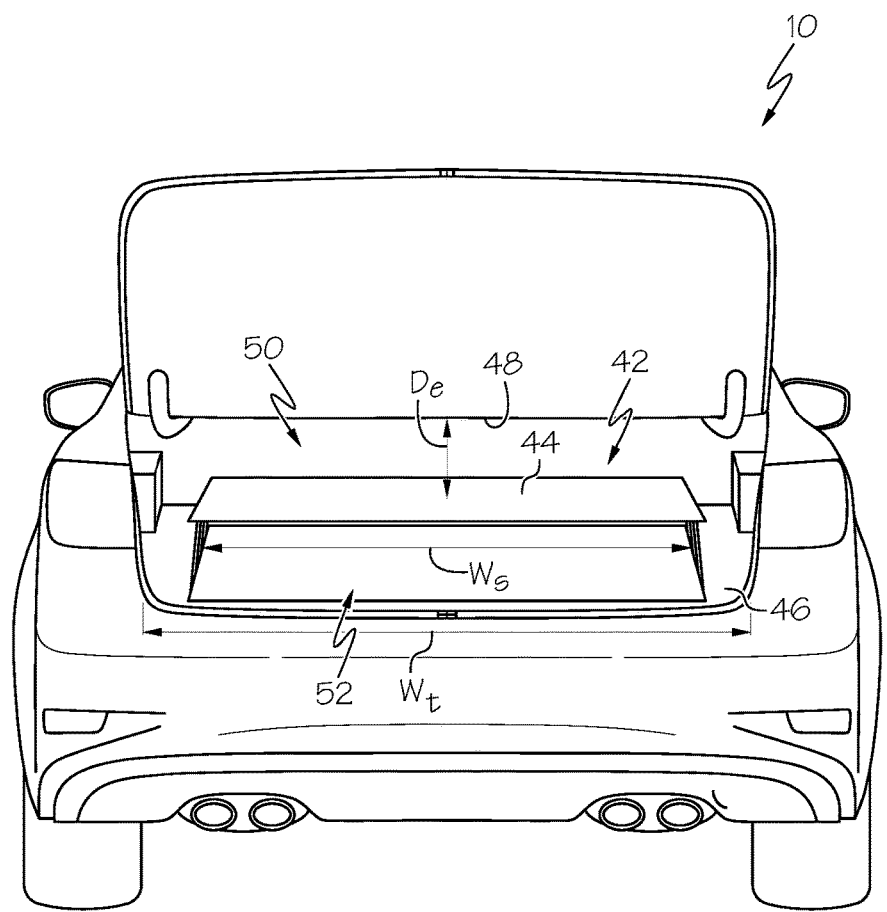
FIG. 3 illustrates another rear view of the vehicle of FIG. 1 including the multi-level rear storage system in an extended configuration, according to one or more embodiments shown and described herein.

Referring to FIG. 3, the multi-level rear storage system 42 is illustrated in the extended configuration with the shelf member 44 deployed spaced from the rear floor 46. In the extended configuration, the shelf member 44 divides the rear storage volume 40 into an upper rear storage volume 50 located above the shelf member 44 and defined between the shelf member 44 and the top 48 of the rear storage volume 40 and a lower rear storage volume 52 located below the shelf member 44 and defined between the shelf member 44 and the rear floor 46. In the extended configuration, a decreased distance De (compared to distance Dr) may be provided between the shelf member 44 and the top 48 of the rear storage volume 40. As such, the extended configuration of the multi-level rear storage system 42 can facilitate placement of relatively short items within the both the upper rear storage volume 50 and the lower rear storage volume 52, which can increase the overall surface area provided by the rear storage volume 40 for such shorter items. The shelf member 44 can also reduce a need to stack items on top of one another by providing the additional storage level.

Figure 4:
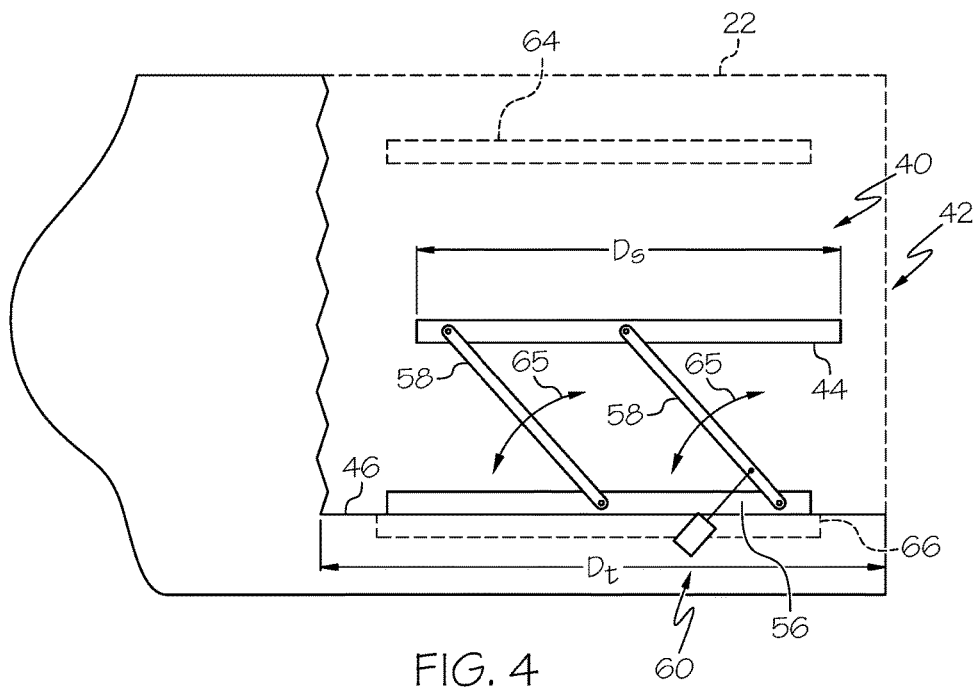
FIG. 4 illustrates a diagrammatic side view of the multi-level rear storage system of FIG. 3.

The dimensions of the shelf member 44 may be dictated by various design considerations and the dimensions of the rear storage volume 40. For example, the shelf member 44 may have a width Ws that is at least about 50 percent of a maximum width Wt of the rear storage volume 40, such as at least about 75 percent of the maximum width Wt. Likewise, the shelf member 44 may have a depth Ds that is at least about 50 percent of a maximum depth Dt of the rear storage volume 40, such as at least about 75 percent of the maximum depth Dt (FIG. 4). While the shelf member 44 is illustrated as being rectangular, it may be any suitable shape, such as round or even a customized shape.

Referring to FIG. 4, a diagrammatic side view of the multi-level rear storage system 42 is illustrated in the extended configuration. In some embodiments, the multi-level rear storage system 42 may include a base member 56 that is used in supporting the shelf member 44 in the extended configuration. Extendable support members 58 may be moveably connected to the base member 56 that can be used in placing the shelf member 44 in both the extended and retracted configurations. For example, one or more of the extendable support members 58 may be connected to an actuator 60 (e.g., a pneumatic, hydraulic, motor, etc.) that can move the extendable support member 58 (e.g., in the direction of arrows 65). In another embodiment, the actuator 60 may, itself, be the extendable support member 58. For example, the actuator 60 may be a pneumatic actuator having a piston that can extend and retract and move the shelf member 44 between extended and retracted configurations directly. In another embodiment, the extendable support members 58 may be spring biased toward the extended configuration. A latch may be provided that can be released to allow the extendable support members 58 and shelf member 44 to move to the extended configuration due to the bias force. The user may then apply a manual force to overcome the bias and latch the extendable support members 58 in the retracted configuration.

The rear door 22, represented by dashed lines, may be placed in the closed configuration with the multi-level rear storage system 42 in the extended configuration. In some embodiments, the multi-level rear storage system 42 may have multiple extended configurations between a fully extended configuration and a fully retracted configuration that spaces the shelf member 44 various distances from the rear floor 46. Such arrangements can allow for multiple positions of the shelf member 44 to accommodate items of different sizes. While a single shelf member 44 is illustrated, there may be more shelf members, as represented by dotted lines 64. As represented by dotted lines 66, in some embodiments, a compartment may be provided below the rear floor 46 into which the shelf member 44 can retract. Such an arrangement can allow for concealing the multi-level rear storage system 42 beneath the rear floor 46. For example, a hatch may be provided that can be closed and opened to conceal and allow access to the multi-level rear storage system 42.

Figure 5:
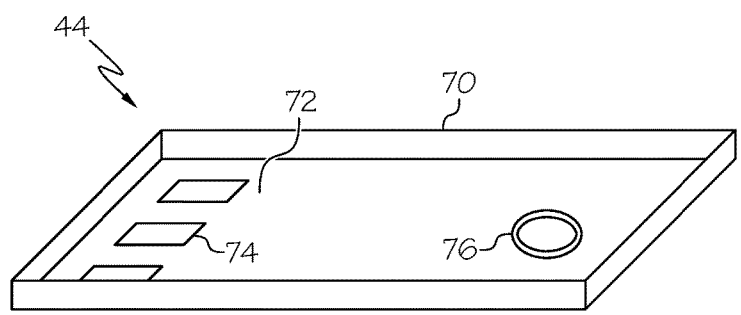
FIG. 5 illustrates a perspective view of a shelf member for use with the multi-level rear storage system of FIG. 3, according to one or more embodiments shown and described herein.

While the shelf member 44 is illustrated as being substantially flat or planar, the shelf member 44 may have a variety of features. For example, referring briefly to FIG. 5, a ledge or edge barrier 70 may be provided about the periphery of the shelf member 44 to inhibit sliding or rolling of items off of the shelf member 44 during transport. Other features may be provided, such as friction pads, carpet or coatings 72 that inhibit movement of items, for example, using various surface friction features 74. Bins 76 or other features may be provided to facilitate holding of various items.

The multi-level rear storage system 42 may be operated by the user manually (e.g., using a key fob, personal computing device or other user input provided by the vehicle) and/or the multi-level rear storage system 42 may be operated automatically, for example, based on some sensed input. For example, a vehicle ECU may operate the multi-level rear storage system 42 in response to an input received from a key fob. As another example, the vehicle 10 may include an image recognition system that recognizes presence of a grocery cart or other object that can cause the multi-level rear storage system 42 to automatically move into the extended configuration.

Figure 6:
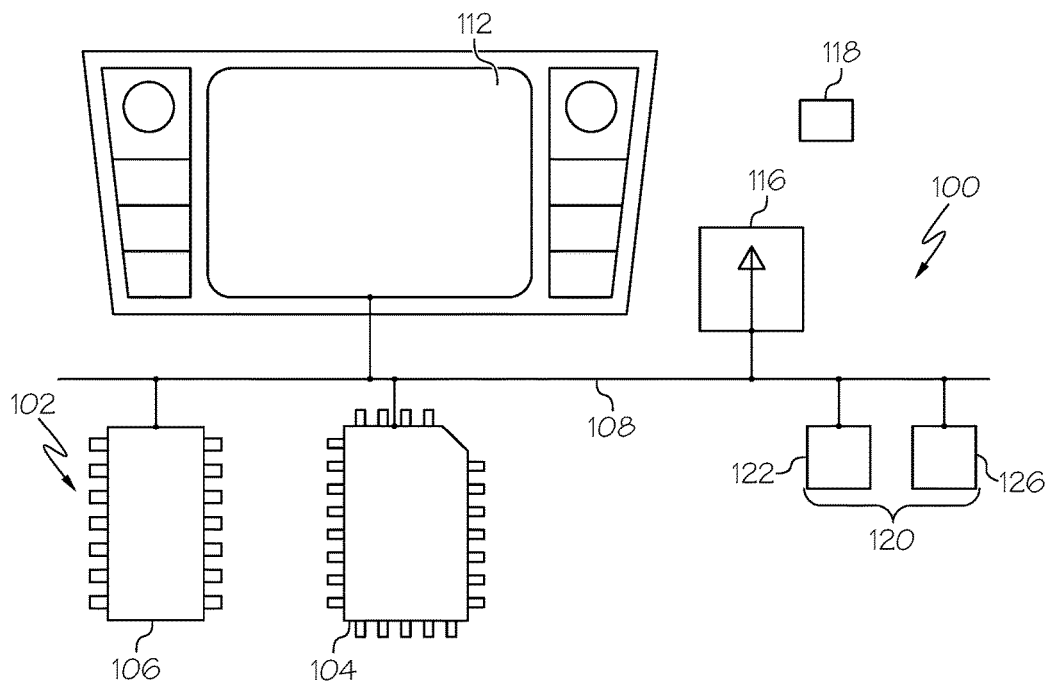
FIG. 6 depicts a communication path of the vehicle of FIG. 1, according to one or more embodiments shown and described herein.

Referring to FIG. 6, the vehicle 10 may include, for example, an image recognition system 100 that utilizes one or more computing devices 102 that can be any type of vehicle-installed (ECU), handheld, desktop, or other form of computing device, or can be composed of multiple computing devices. One or more processors 104 in the computing device 102 and elsewhere can be a single device, or multiple devices, capable of manipulating or processing information. Memory module 106 can be a random access memory device (RAM) or any other suitable type of storage device. The memory module 106 can include data that is accessed by the one or more processors 104 using a communication line 108. The memory module 106 can also include an operating system and installed applications, the installed applications including programs that permit the one or more processors 104 to perform various image recognition processes and operation of the multi-level rear storage system 42.

The one or more processors 104 may be any device capable of executing machine readable instructions. The one or more processors 104 may be coupled to the communication line 108 that provides signal interconnectivity between various modules. Accordingly, the communication line 108 may communicatively couple any number of processors with one another, and allow the modules coupled to the communication line 108 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

The communication line 108 may be formed from any medium that is capable of transmitting a signal such as, for example, conductive wires, conductive traces, optical waveguides, or the like. In some embodiments, the communication line 108 may facilitate the transmission of wireless signals, such as WiFi, Bluetooth, and the like. Moreover, the communication line 108 may be formed from a combination of mediums capable of transmitting signals. In one embodiment, the communication line 108 comprises a combination of conductive traces, conductive wires, connectors, and buses that cooperate to permit the transmission of electrical data signals to components such as processors, memories, sensors, input devices, output devices, and communication devices. Accordingly, the communication line 108 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The image recognition system 100 can include the one or more memory modules 106 coupled to the communication line 108. The one or more memory modules 106 may comprise RAM, ROM, flash memories, hard drives, or any device capable of storing machine readable instructions such that the machine readable instructions can be accessed by the one or more processors 104. The machine readable instructions may comprise logic or algorithm(s) written in any programming language of any generation (e.g., 1GL, 2GL, 3GL, 4GL, or 5GL) such as, for example, machine language that may be directly executed by the one or more processors 104, or assembly language, object-oriented programming (OOP), scripting languages, microcode, etc., that may be compiled or assembled into machine readable instructions and stored on the one or more memory modules 106. The machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any suitable computer programming language, as pre-programmed hardware elements, or as a combination of hardware and software components.

In some embodiments, the one or more memory modules 106 may include a database that includes object identification information, navigation information and/or map information. The one or more memory modules 106 may include an image recognition database and algorithm to allow an object vehicle video system 110 to identify a target object type including various items or groups of items sensed within a vicinity of the vehicle 10.

The vehicle 10 includes a display 112 for providing visual output such as, for example, maps, navigation, entertainment, information, or a combination thereof. The display 112 may be coupled to the communication line 108. Accordingly, the communication line 108 can communicatively couple the display 112 to other modules of the vehicle 10. The display 112 may include any medium capable of transmitting an optical output such as, for example, a cathode ray tube, light emitting diodes, a liquid crystal display, a plasma display, or the like. Moreover, the display 112 may be a touch screen that, in addition to providing optical information, detects the presence and location of a tactile input upon a surface of or adjacent to the display 112. Accordingly, the display 112 may receive mechanical input directly upon the optical output provided by the display 112. In this regard, the display 112 can function as a user input that allows for user control of the multi-level rear storage system 42. Additionally, it is noted that the display 112 can include at least one of the one or more processors 104 and the one or memory modules 106. The display 112 could be at least one of a heads-up display, an instrument cluster display, and a mobile device display. In some embodiments, the vehicle 10 may have a plurality of displays. In such embodiments, the vehicle 10 could also have a plurality of different types of displays. For example, and not as a limitation, the vehicle 10 could have an in-dashboard display and a heads-up display for displaying information directly on a windshield or other window of the vehicle 10.

The vehicle may also include a communications module 116 for communicatively coupling the vehicle 10 to an external device 118, such as a key fob or personal computing device. In some embodiments, the communications module 116 may communicatively couple the vehicle 10 to other vehicles, which may be referred to as vehicle-to-vehicle communication. Such an arrangement may be useful for the multi-level rear storage system 42 where items are to be transferred between vehicles. The communications module 116 can be communicatively coupled to the communication line 108 and can be any device capable of transmitting and/or receiving data via a network. Accordingly, the communications module 116 can include a communication transceiver for sending and/or receiving any wired or wireless communication. For example, the communications module 116 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the communications module 116 includes hardware configured to operate in accordance with the Bluetooth wireless communication protocol.

The image recognition system 100 may include one or more sensors 120 communicatively coupled to the one or more processors 104. The one or more sensors 120 can include, but are not limited to, cameras, LiDAR, RADAR, and proximity sensors. In some embodiments, multiple types of sensors 120 can be used to provide a variety of information to the computing device 102.

For instance, FIG. 6 illustrates the vehicle 10 utilizing a variety of sensors 120. A camera 122 may be coupled to the communication line 108 to communicatively couple the camera 122 to other modules of the vehicle 10. The camera 122 may be any device having an array of sensing devices capable of detecting radiation in an ultraviolet wavelength band, a visible light wavelength band, or an infrared wavelength band. The camera 122 may have any resolution. Suitable cameras may include, for example, a video camera, charge coupled device (CCD) camera, complementary metal-oxide-semiconductor (CMOS) camera, etc. Some embodiments may include multiple cameras. In operation, the camera 122 may be able to detect objects within a vicinity of the vehicle 10. Further, the camera 122 and/or the one or more processors 104, based on input from the camera 122, may be able to determine one or more characteristics about the objects such as, for example, size of the objects, number of objects, etc. through image recognition capabilities.

The vehicle 10 may further include other sensors represented by a second sensor 126 in addition to the camera 122. The second sensor 126 is coupled to the communication line 108 such that the communication line 108 communicatively couples the second sensor 126 to other modules of the vehicle 10. The second sensor 126 may be any device, for example, that can be used by the computing device 102 in identifying objects and their characteristics. In some embodiments, the second sensor 126 may include RADAR, LiDAR and/or the like.

Figure 7:
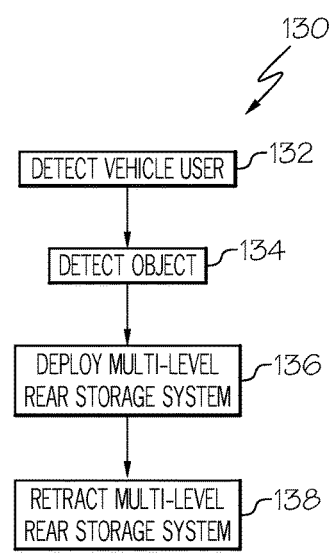
FIG. 7 illustrates an automated method of deploying the multi-level rear storage system of FIG. 3, according to one or more embodiments shown and described herein.

Referring to FIG. 7, an automated method 130 of deploying the multi-level rear storage system 42 includes detecting the presence of a vehicle user approaching the vehicle 10 at step 132. The presence of the vehicle user can be accomplished through any suitable process such as using the communications module 116 to detect a key fob within a predetermined distance of the vehicle 10 that is with the vehicle user and/or through image recognition, which can identify the vehicle user. At step 134, the image recognition system 100 may detect the presence of one or more items being transported with the vehicle user. If the image recognition system 100 determines that the one or more items meet predetermined criteria, the computing device 102 may instruct the multi-level rear storage system 42 to deploy into the extended configuration at step 136. For example, the image recognition system 100 may recognize the presence of a grocery cart that is carrying multiple grocery items and the multi-level rear storage system 42 may be placed in the extended configuration. Other information may also be used, such as vehicle location information provided to the computing device 102 and/or learned factors, such as the vehicle user tendency to open the rear door 22 when visiting a particular location, such as a grocery store. Further, the multi-level rear storage system 42 may also be customized by the vehicle user to deploy and/or retract between the retracted configuration and the extended configuration upon the occurrence of preselected conditions, such as location of the vehicle (e.g., as provided by a GPS), duration away from the vehicle, opening of the rear door 22, etc. Gesture and voice command recognition may also be used. At step 138, the multi-level rear storage system 42 may retract to the retracted configuration under predetermined conditions, such as if the rear door 22 is not opened for a period of time or upon starting the ignition, opening the front door, etc. without opening the rear door 22.

The above-described multi-level rear storage systems can provide additional surface area to place items by providing one or more shelf members on which items can be placed both on and below the shelf members. While one shelf member is described primarily above, there may be additional shelf members. The number of shelf members and distances therebetween can depend, at least in part, on the size of the rear storage volume. The multi-level storage systems have both a retracted configuration and an extended configuration. The multi-level storage system being in the retracted configuration and/or the extended configuration may be customizable by the vehicle user using an input, such as a personal computing device, vehicle display, etc. Further, the multi-level storage system may move into the extended configuration upon occurrence of a predetermined event, such as detected by an image recognition system. The vehicle may also learn certain vehicle user behaviors such as a tendency to open the rear door upon leaving a grocery store.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
a rear door assembly having an open configuration that allows access to a rear storage volume and a closed configuration that inhibits access to the rear storage volume; and
a multi-level rear storage system located in the rear storage volume, the multi-level storage system having a retracted configuration where a shelf member is relatively near a rear floor of the rear storage volume and an extended configuration with the shelf member spaced-apart from the rear floor thereby defining an upper rear storage volume above the shelf member and a lower rear storage volume below the shelf member, wherein
the multi-level rear storage system comprises an actuator that moves the shelf member between extended and retracted configurations without manual input on the shelf member.

2. The vehicle of claim 1, wherein the multi-level rear storage system is sized to be placed in the extended configuration with the rear door in the closed configuration.

3. The vehicle of claim 1, wherein the multi-level rear storage system comprises multiple shelf members.

4. The vehicle of claim 1, wherein the multi-level rear storage system moves from the retracted configuration to the extended configuration based on an input from a vehicle user.

5. The vehicle of claim 1, wherein the multi-level rear storage system moves from the retracted configuration to the extended configuration based on input from a vehicle sensor.

6. The vehicle of claim 5, wherein the input is an image from a camera.

7. The vehicle of claim 1 comprising a compartment that is recessed below the rear floor, the shelf member received by the compartment with the multi-level rear storage system in the retracted configuration.

8. A method of increasing storage area in a rear storage volume of a vehicle, the method comprising:
   providing a multi-level rear storage system located in the rear storage volume, the multi-level storage system having a retracted configuration where a shelf member is relatively near a rear floor of the rear storage volume and an extended configuration with the shelf member spaced-apart from the rear floor; and
   placing the multi-level rear storage system in the extended configuration thereby defining an upper rear storage volume above the shelf member and a lower rear storage volume below the shelf member, wherein
   the multi-level rear storage system comprises an actuator that moves the shelf member between extended and retracted configurations without manual input on the shelf member.

9. The method of claim 8 comprising closing a rear door of the vehicle with the multi-level rear storage system in the extended configuration.

10. The method of claim 8, wherein the multi-level rear storage system comprises multiple shelf members.

11. The method of claim 8, wherein placing the multi-level storage area in the extended configuration is based on an input from a vehicle user.

12. The method of claim 8, wherein placing the multi-level storage area in the extended configuration is based on input from a vehicle sensor.

13. The method of claim 12, wherein the input is an image from a camera.

14. The method of claim 8 comprising a compartment that is recessed below the rear floor, the shelf member received by the compartment with the multi-level rear storage system in the retracted configuration.

15. A multi-level rear storage system for a rear storage volume of a vehicle, the multi-level rear storage system comprising:
   a shelf member that is relatively near a rear floor of the rear storage volume in a retracted configuration and spaced-apart from the rear floor in an extended configuration thereby defining an upper rear storage volume above the shelf member and a lower rear storage volume below the shelf member and an actuator that moves the shelf member between extended and retracted configurations;
   wherein the multi-level rear storage system is sized to be placed in the extended configuration with a rear door of the vehicle in a closed configuration to inhibit access to the rear storage volume and the actuator moves the shelf member without manual input on the shelf member.

16. The multi-level rear storage system of claim 15 comprising multiple shelf members.

17. The multi-level rear storage system of claim 15 further comprising an extendable support member that moves the shelf member between extended and retracted configurations.

* * * * *